Patented Aug. 16, 1927.

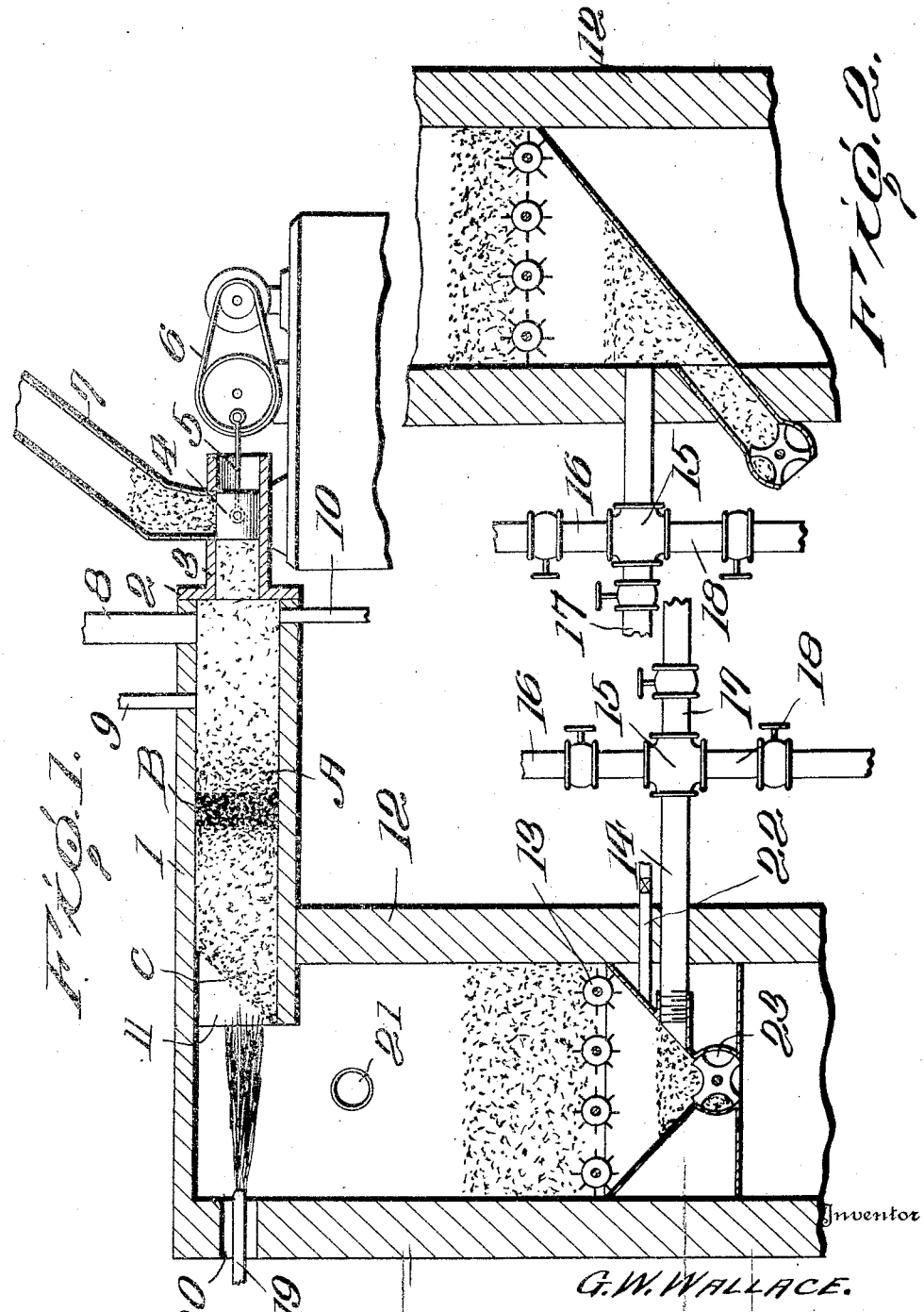

1,639,390

UNITED STATES PATENT OFFICE.

GEORGE W. WALLACE, OF SAN FRANCISCO, CALIFORNIA.

CARBONIZING APPARATUS.

Application filed May 18, 1925. Serial No. 31,148.

This invention relates to carbonizing apparatus; and it comprises a carbonizing apparatus adapted for regulably heating organic materials for the production of vapors and gases and a residue of carbon or carbonaceous material, comprising means for establishing and maintaining a relatively short, pervious, moving, horizontal column of organic material with one end relatively hot and the other end relatively cool and a certain type of temperature gradient therebetween, means for feeding fresh pervious material to one end of said column, means for removing gases, vapors and condensed liquids from the same end of the column, gas firing means adapted to apply regulated heat to the other end of said column and means for collecting exhausted materials discharged at this end of the column, said means including means for further treatment of such exhausted materials; all as more fully hereinafter set forth and as claimed.

Practically all organic or carbonaceous matters undergo a spontaneous decomposition with evolution of vapors and gases when brought to a certain temperature with production of a residue of carbon or material rich in carbon. It is seldom wholly carbon. This breaking down reaction may be here called carbonization. It is the underlying or basic reaction in various kinds of destructive distillation and gas making processes; as in charring wood and making coke. In these various operations, however, while carbonization occurs in the material treated and is the basis of such operation, other things also happen and the actions are, or may be, tolerably complicated. It is an object of the present invention to provide an operation in which carbonization of any particular material may be performed, as nearly as may be, per se; that is, with as little complication by other actions as may be.

Carbonization is generally, and perhaps invariably, an exothermic action; it is attended with a development of heat. In the various technical processes utilizing carbonization, this development of heat is sometimes a factor of considerable importance (although not always so recognized); as in charring wood, for example. Dry wood in a hot chamber will break down to charcoal with evolution of gases and vapors without the necessity for a supply of external heat. The reaction keeps itself going as long as dry wood is supplied and charcoal removed. Some oil shales and coals, not too rich in inorganic matter (ash), will do the same. In these cases, the carbonization reaction, once initiated, is a self-sustaining action which may propagate itself through a mass of hot material. Sometimes, however, and particularly with materials rich in ash, or poor in oxygen, or both, maintenance and propagation require a steady supply of external heat; the action is endothermic as a whole; the breaking down action is masked thermally.

The thermal balance sheet in any of these actions involves a consumption of heat for bringing the material to reaction temperature (generally somewhere around 800° F.); a consumption of heat in producing vapors and gases and an evolution of heat in carbonization proper. The last very often outbalances the second and sometimes the total of the first and second; as in the case of the dry wood mentioned. In technical operation, however, the balance sheet is, of course, further complicated by heat used up in drying, in radiation losses, in heating inert materials, in sensible heat of the products and so on. In ordinary practice, internal development of heat in the material is generally not much considered; firing being done without regard to it. And usually, for the sake of speed, the firing is forced; with the result that the carbonization is no longer any very simple action. Under these conditions, the primary products of carbonization undergo secondary carbonization and decomposition, and the results are complex and variable.

Sometimes carbonization is practiced in externally heated retorts, as in making coal gas; sometimes, it is effected by internally developed combustion heat, as in beehive ovens. In neither case is any control of its development or maintenance ordinarily attempted.

In the present invention, the noted facts are taken into consideration in providing an apparatus whereby a controlled carbonization can be effected in the most diverse materials with production, in most cases, of primary carbonization products only. The use of the apparatus however, as hereinafter described, is sufficiently flexible to allow a certain amount of secondary action either on the produced volatiles or on the carbonaceous residue, if this be wanted, and means are provided for further treatment of the fixed residues of carbonization.

In principle, the present invention consists in establishing and maintaining a relatively short, moving, pervious, horizontal column of material with a feed of cold material to one face (the feed end) and a supply of flaming heating gases to the other face, with a removal of hot carbonized residue from said other face (the discharge end). The heat at one end of the column and the cooling at the other end of the column are so balanced against each other as to result in carbonization taking place in a relatively stationary plane, zone or layer; fresh material moving to this zone through a short preheating zone, there undergoing reaction and then moving on and away. These departing materials, which are at the temperature of the carbonizing zone, pass the heating gases in countercurrent and serve to bring such gases to the exact temperature necessary. The gases and vapors produced in carbonization are pushed forward into and through the cool material advancing to the carbonizing zone by the heating gases. As a rule, the feed end of the column is maintained at a temperature low enough to permit condensation of some or much of the volatile bodies produced in carbonization. Generally, it is below 212° F. Cooling to the point desired may be aided by the introduction of a little steam or water at or near the feed end of the column. If the column is inclined a little from the horizontal toward the feed end, condensed liquid materials drain forward and cannot become overheated or cracked. If, on the other hand, the column is given a slight inclination in the other direction, some of the condensed high boiling or tarry bodies may drain backwards towards the heating zone and undergo some secondary decomposition. The amount of this secondary cracking depends on the temperature of the feed end and the degree of inclination. Usually, the reaction chamber is of the same diameter throughout, but, with materials swelling or shrinking in carbonization, it may be given a corresponding taper.

As so far described, the material (oil shale, woody matter, peat, coal, etc., etc.) is treated as a relatively short, pervious, horizontal, or nearly horizontal, moving column. The column may be contained in any suitable refractory casing. To one end, the feed end, the material is fed by some sort of automatic stoking means. At the other end, the discharge end, heating gases are supplied; generally as a burning gas mixture. If the material is supplied cold, or nearly so, and if it is not dried, the feed end is at some temperature below 212° F. If the heating gases be, as is generally the case, at a temperature above 2000° F., their temperature is automatically reduced by the endothermic reduction of $CO_2$ and $H_2O$ to a temperature somewhere around 1500° F.–1800° F. at a point just within the discharge face; the particular temperature depending on circumstances. From this point there is a declining temperature gradient towards the carbonizing zone which is usually at a temperature around 800° F. Generally there is an increase in temperature at this point; this increase being sometimes marked and sometimes but slight. An increase however is generally shown by the pyrometer. Beyond the carbonizing zone toward the feed end, there is again a declining temperature gradient which is tolerably sharp. In this region is a short preheating zone where the materials are bought to a temperature where carbonization sets in. Ordinarily, the moving column I use is not to exceed three or four diameters in length; and the various zones mentioned are quite sharply marked. The location of the carbonizing zone is practically stationary in normal operation and, with some apparatus and some materials is sharply marked by a red hot band outside. The better the heat insulating lining and the less exothermic the material the less is the tendency toward the appearance of the red band. The red band may move back and forth slightly but is practically stationary. In handling one particular peat, with an 18-inch cylindrical reaction chamber, all the zones mentioned were sharply developed within a length of 32 inches; sometimes within a length of 24 inches. The feed end was at a temperature below 212° F. and the discharge end at a temperature over 2000° F.

The hot carbonized material discharged from the column may be treated in various ways to accomplish various results. It may, if sufficiently rich in carbon, be treated with an air current to produce producer gas; and some or all of this producer gas may be employed in heating the hot end of the moving column. Instead of air, products of combustion or steam may be blown through the hot material to take up its heat and be used as a component of the gases going to the hot end of the column. Or a certain amount of these bodies may be mixed with air going through the hot carbon to give a mixed gas and prevent undue heating of the discharged material. Where activated carbon is wanted, the use of a draft of steam or products of combustion through the discharged material will give a good product. Conditions should be so controlled that while the material discharges at a relatively low temperature, at some point in the countercurrent contact between gases and solids high temperatures should prevail. If the discharged carbonized material is poor in carbon, as with the residues from some oil shales, it may serve only, or mainly, for preheating air for burning gas from another source to heat the hot end of the column. Many other permutations are possible.

In the accompanying illustration I have shown, more or less diagrammatically, an apparatus within my invention and capable of use in the performance of the various described processes. In this showing Fig. 1 is a view in central vertical section with some parts in elevation of a suitable apparatus; and Fig. 2 is a fragmentary view of a modification of the discharge chamber of Fig. 1.

In this showing, element 1 is the reaction chamber proper. It may be of iron or steel, lined with refractory material, of brick, etc. It is best, however, to make it as shown, as a metal casing lined with a material of small heat conductivity. It may be inclined slightly in either direction. It is shown closed at the feed end by plate 2 through which passes any suitable mechanical feed device. I have shown an ordinary form of stoker consisting of conduit 3 and plunger 4 actuated by crank 5 from driving means 6. As the plunger or piston 4 reciprocates, material enters from hopper 7 as successive charges or plugs which are fed forward into the reaction chamber. At the top, the reaction chamber is provided with gas outlet pipe 8 leading to suitable condensing means (not shown). Ordinarily, the condenser is connected to suction means (not shown). The condensing means, as a rule, should include scrubbing means, since the products of reaction in the present case are mixed with the gases used for heating, so that simple cooling does not give full condensation. Bottom outlet 10 is provided for removing condensed vapors of oils, tar and water. The casing is also provided with inlet pipe 9 through which steam or water may be introduced for controlling the temperature. As the materials move through the reaction chamber, they are dried and preheated in a relatively short, vertical layer indicated as A and beyond this preheating layer they enter a layer B where active carbonization takes place. As a rule, the line of demarkation between zone B and zone A is rather sharply defined. In B, the materials undergo active carbonization, the gases and vapors produced passing forward against the incoming material and giving preheat. The location of B is practically stationary, although it may shift back and forth a little; and with any given material its thickness or width is also tolerably constant. In most cases, the temperature prevailing in B is around 800° F. Beyond B, the exhausted material passes forward to the outlet end 11 of the reaction chamber 1. The line of demarcation between the end of zone B and the rest of the column passing forward to the discharge end is also usually tolerably sharply marked. At the discharge end 11, the temperatures are commonly rather high; often above 2000° F. Exhausted material leaving the end 11 is dropped into a pile or accumulation in vertical shaft 12. As shown, I have an ordinary form of grate 13 near the bottom of this shaft, allowing me to drop and discharge a regulated portion of material to conveyor 23. Discharge of material beyond the grate 13 is correlated with input of material by feed means 4.

In the showing of Fig. 2, the elements are the same as in Fig. 1, save that there is a lateral or side discharge of material, instead of a central discharge. This is convenient where devices under the present invention are assembled in battery.

Beneath the grate and above the conveyor 23 is an inlet pipe 14 coming from cross 15. Valved pipe 16 may be used for supplying air, valved pipe 17 for supplying steam and valved pipe 18 for supplying products of combustion or other type of gas; for example, combustible gas. In the upper part of chamber 12 is located burner means 19 which may be used for supplying gas, air entering through dampered port 20. Or, in the event that gas is supplied through or at the expense of the accumulation in 12, this pipe 19 may be used for supplying air. Where the accumulation in 12 is used to produce gas, any excess of gas not needed in the reaction chamber may be removed through dampered outlet 21 or may be led through material being carbonized to increase the rapidity of the reaction or to furnish reducing conditions. When water vapor is wanted in the apparatus and material discharged by 23 is to be cold, water may be introduced into the base of chamber 12 through water inlet 22. Sometimes I discharge the exhausted material at the base of shaft 12 in the same way as is done in a water sealed gas producer; that is, simply sealing the bottom of the shaft by an accumulation of wet residue.

The described apparatus may be used in a wide variety of different operations producing a corresponding variety of products, both as distillates and as residues. It is particularly suitable for the distillation of oil shale of any of the known types where the valuable product is oil and the residue is a waste material. The carbonaceous material in shale is sometimes of an oily or asphaltic nature and sometimes it is more of a bituminous nature. In either event, the material if brought to about 800° F. undergoes carbonization with production of gases and vapors. The vapors are largely of high boiling oils and I do not usually desire any secondary cracking of these materials. As stated, the present apparatus is intended to effect as nearly as may be only a primary carbonization. Cracking of these oils is effected more conveniently elsewhere. In use on oil shale, the granulated material of convenient size is fed through 7 and pushed into the reaction chamber as successive plugs or charges by piston 4. As it enters the reaction chamber, it meets vapors and gases which usually carry large amounts of water vapor. This water vapor and high boiling oils condense to a large extent and drain away through outlet 10. Uncondensed gases and vapors go through 8 to a suitable scrubbing system (not shown). Uncondensed gas may be collected and used for the purposes of the apparatus, or any other purpose. Sometimes, in order to aid in cooling, it is convenient to introduce steam or water at 9. The moist material, which cannot at this point be at a temperature above 212° F., passes into zone A where the moisture is evaporated and the material preheated by the gases coming from the carbonizing zone. From zone A the preheating and drying zone, the temperature ascends sharply in zone B. Beyond zone B, the temperature of the material usually drops somewhat and then ascends to a rather fixed temperature around 1800° F. along a line which I have indicated as C; this being the point where residual carbon reduces $CO_2$ and $H_2O$ in the flame gases used for heating. At point 11, the spent material emerges and drops into shaft 12. There is a more or less vertical face of material at 11 and into this face pass hot flame gases. These flame gases may be furnished in various ways. In one way, combustible gas, which may come from the condensing system, is admitted at 19 and a suitable amount of air led in through dampered port 20. Or air may be admitted at 19 and gas formed from the accumulation in 12. Which is the more convenient depends upon the particular shale. If the shale is rich in fixed carbon, enough so that it is worth while making gas from it, chamber 12 may be used as an ordinary type of gas producer, air, or a mixture of air and steam, or of air and products of combustion, or all three, being blown in at 14. In this event, more gas will ordinarily be produced than is needed in the reaction chamber and the excess may be removed at 21. If air alone is blown through the accumulation in 12 the resultant producer gas may be hot enough to serve in the reaction chamber without any substantial combustion; in which event, D may be simply blanked off. I do not really require in the gases fed to the reaction chamber, any temperature above, say, 1800 or 2000° F.; and producer gas may have a temperature considerably above this.

The residues from shaft 12, in using oil shale, may be simply removed as waste material. In carbonizing oil shale in the manner described, a large proportion of the oily product produced is condensed toward the feed end of the reaction chamber and flows away through 10, leaving relatively little volatile oil vapors to be scrubbed out of the gas mixture escaping at 8. The heavy oils coming from 10 (together with condensed water) may be elsewhere cracked or otherwise utilized. Very often, they may be refined and handled in the same way as crude petroleum. Somewhat lower boiling oils may be obtained by giving the reaction chamber a slight upward inclination toward the feed end. But generally, with shales giving a high yield of oil, it is more advantageous to have the inclination the other way; so that the feed end is slightly, but not materially, lower than the other end. With shales carrying much asphaltic material, the other inclination is sometimes more advantageous. With most shales, the scrubbing system (not shown) should include means for recovering ammonia and, sometimes, cyanides. With nitrogenous shales, it is advantageous to have substantial amounts of water vapor in the gases entering the discharge face of the column. And in any event, it is desirable that these gases should be of at least slightly reducing nature; this being really necessary where the discharged material is poor in carbon, since I am relying upon $CO_2$—$H_2O$ reduction to give me an adjusted gas temperature.

Blast pressure may be used but it is ordinarily more advantageous to operate under reduced pressure in the carbonizing apparatus; this reduced pressure being produced by the suction means beyond the condensing means. Suction applied to outlet 10 is also advantageous. It is advantageous to maintain the temperature at the feed end around 212° F., allowing as much water to escape as vapor through 8 as is convenient. Sometimes, and with some heavy oil products, it is desirable to remove a considerable amount of the water vapor as such by 8 as there is some trouble with oil-water accumulations which are difficult to separate.

Naturally, a series of reaction chambers may be used in connection with a common receiving chamber 12. The modification shown in Fig. 2 is particularly convenient for this purpose.

In the use of this apparatus upon oil shales, there have been obtained yields in excess of 95 per cent of the total possible oil yields, as determined by assays using U. S. Bureau of Mines methods; and there have been larger yields of ammonia (collected as sulfate) than have been obtained with the same shale using externally heated retorts.

The present apparatus may be used in producing coke from bituminous coal. In this use, shaft 12 serves for collecting coked residues and for quenching the same. In coking coal, the raw material may be crushed to, say, about 2 inches or less. The discharged material in 12 is cooled in such a manner as to give a coke having a proper amount of retained volatile matter and of proper size for domestic purposes. In this use, the discharge mechanism should be of such a character as not to produce much breeze. Quenching in 12 may be by steam or by water vapor admitted from 22. In distilling Knight coal from Utah to form coke, a yield of 35 gallons of relatively high gravity tar oil is obtained per ton, together with a high yield of sulfate of ammonia, this yield being sometimes as high as 60 pounds per ton. The tar oil produced is a true low temperature product and of better character than that obtained with externally heated retorts; the quantity also being much greater. In another and copending application, Serial No. 111,391, filed May 24, 1926, I have described and claimed a coking process embodying these principles.

By a slight modification of operation in carbonizing coal, chamber 12, instead of discharging coke, will discharge only ash, the carbonaceous residue being completely gasified in 12 by air, or air and steam, or air and products of combustion, or air, products of combustion and steam; according to the character and amount of gas wanted. It is, of course, possible to run 12 in this event as a blue gas generator; operating on ordinary blow-and-run principles. In this event, chamber 12 should be somewhat higher vertically than where coke is made. In another and copending application, Serial No. 81,119, filed January 13, 1926, I have described and claimed a gas-making process embodying these principles.

The apparatus may be advantageously used in distilling peat, turf, woods and lignite. In operating upon lignite, the treatment is the same as when carbonizing coal. It is particularly advantageous for lignite, since vaporization loss of heat in removing water, that is in drying, is precluded where condensed water leaves through 10. In drying in zone A, the water is vaporized but is recondensed so that the vaporization heat is balanced out.

The same considerations apply with peat and turf, as well as with sawdust, shavings and mill waste. They are also true with regard to the disposal of garbage.

One use of the present apparatus which is quite advantageous, is the production of high grade activated carbon from lignite, peat, sawdust, wood waste, peach and apricots pits, etc. It is advantageous here for the reason that the primary carbonization can be effected in the horizontal carbonizing chamber without secondary decomposition of vapors and gases clogging the pores of the carbon. Then the residual carbon may be activated in chamber 12 as an entirely different operation. In other words, the apparatus allows the successive performance of the two successive actions in making activated carbon: (1) the production of carbon with unclogged pores and (2) cleaning out these pores by an oxidizing draft and by a higher temperature. The material dropping into 12 is red hot and is steamed with, or without, the presence of $CO_2$. In 12, the temperature diminishes vertically downward, so that active material may be discharged by 14 cold or at a temperature low enough to preclude oxidation. The activated carbon so discharged may be treated in ways, involving the use of concentrated HCl, washing to neutrality and drying. The other expedients used in making activated carbon may also be here used, as, for example, the addition of carbonates or other form of alkali to the material. A little ground limestone admixed with the material going to the carbonizing chamber is useful. In another and copending application, Serial No. 81,120, filed January 13, 1926, I have described and claimed a process of making activated carbon embodying these principles.

As I have stated, the scrubbing system should be adapted for the recovery of ammonia in treating nitrogenous coals or shales. Where vegetable materials are treated, it should be adapted for the recovery of pyroligneous acid and the materials used for constructing the reaction chamber at the feed end should be adapted to resist the action of acetic acid.

The present apparatus is particularly adapted for carbonizing materials which contain moisture since, to a considerable extent, it obviates loss of heat in forming and discharging water vapor. Sometimes it is advantageous to moisten naturally dry materials in order to assist in maintaining the feed end at a temperature not above 212° F.

What I claim is:—

1. In a carbonizing apparatus, a short and wide, substantially horizontal reaction chamber in the form of a conduit, stoker means for supplying fresh material at one end and advancing the same therethrough as a charge filling the entire cross-section of said conduit, means for removing gases and vapors at the same end and localized heating means for impinging hot gases against a charge in the chamber at the other end, such localized heating means being adapted to permit the establishment and maintenance of a substantially stationary carbonizing zone at one point in said reaction chamber.

2. A carbonizing apparatus comprising a short horizontal cylinder, stoker means for pushing a column of material therethrough, means for supplying a hot gas current through such column in counter current, means at the supply end for removing condensed liquids and means at the same end for removing uncondensed gases and liquids.

3. In a carbonizing apparatus, a short cylindrical chamber, stoker means for pushing granular material therethrough as a moving column, means at the feed end for removing condensed liquids and means for removing gases and vapors, means at the other end for removing and sorting exhausted material, gas firing means at such other end for projecting flame and flame gases on the exit face of said column and means for removing exhausted material from the storage chamber.

4. In a carbonizing apparatus, a vertical reaction and storage chamber with means for removing solid material at its base, firing means at the top of the chamber adapted to project flame transversely thereacross, a short horizontal cylindrical chamber entering the upper part of said reaction chamber in line with said firing means, stoker means at the other end of said horizontal chamber and means located at the same end for removing condensed liquids and for removing vapors and gases.

5. In a carbonizing apparatus, a substantially horizontal carbonizing chamber in the nature of a conduit adapted for the reception of a pervious moving column of solid carbonizable material occupying its entire cross-section, stoker means for feeding material to said column located at and sealing one end of said conduit, firing means located at the other end of the conduit for impinging hot gases on the discharge face of the column, means for removing gases and vapors from the feed end of the conduit, and shaft means adapted to receive discharged solids from said horizontal chamber, said shaft means comprising means for removing solids from its base and means at the base for introducing air, steam and products of combustion, or mixtures of the same.

6. In a carbonizing apparatus, a vertical shaft chamber, means for maintaining the base thereof cool, means for removing cooled material, firing means entering said chamber near its top laterally, and a horizontal carbonizing chamber in line with said firing means and adapted to discharge into said shaft chamber, said carbonizing chamber being provided with means for introducing and moving a full area column of granular, pervious carbonizable material therethrough, and means for removing condensed liquids and for removing gases and vapors at the charging end.

7. In a carbonizing apparatus, means for establishing and maintaining a short moving column of pervious carbonizable matter, means for maintaining a relatively stationary zone of carbonization at a mid point in said column with a short preheating zone between said carbonization zone and the feed end of said column, means for separately removing liquids and gases at said feed end and firing means adapted to project flame and flame gases on the face of material at the other or discharge end.

8. A carbonizing apparatus comprising a short horizontal cylinder, stoker means for pushing a column of material therethrough, means for supplying a hot gas current through such column in countercurrent, means at the supply end for removing condensed liquids and means at the same end for removing uncondensed gases and liquids and shaft means at the other end for removing carbonized fuel, said shaft means comprising means for removing solids at the bottom, and means for introducing at the base, air, steam and products of combustion, or mixtures of the same, at will.

9. In carbonizing apparatus the combination with a vertical reaction chamber of a horizontal reaction chamber in communication therewith near the top, the horizontal reaction chamber being provided with heat insulating material and having at one end means for feeding material to be carbonized therethrough, and heating means associated with the vertical reaction chamber to direct gases through the horizontal reaction chamber in a direction opposite to the feed of material therein, a drain on the horizontal reaction chamber for liquid products of the reaction and exhaust means on the horizontal chamber for exhaust gases, the feeding means arranged to seal the feed end of the horizontal chamber.

10. In carbonizing apparatus, the combination with a vertical chamber of a horizontal reaction chamber opening into said vertical chamber near its top, means for feeding and moving solid carbonizable material to be treated through the horizontal chamber as a column occupying the entire cross-section of the chamber and for discharging such material into the vertical chamber, such feeding means being arranged to seal the feed end of the horizontal chamber, means for generating hot gases in the vertical chamber, means for impinging said hot gases on the discharge face of said column and for passing such hot gases through the column in countercurrent to the movement of the solid material, and means for removing gases and vapors at the feed end of the horizontal reaction chamber.

In testimony whereof, I have hereunto affixed my signature.

GEORGE W. WALLACE.